Feb. 10, 1959     A. BOTTI     2,872,793
SPEEDOMETER CABLE FITTING
Filed March 21, 1957
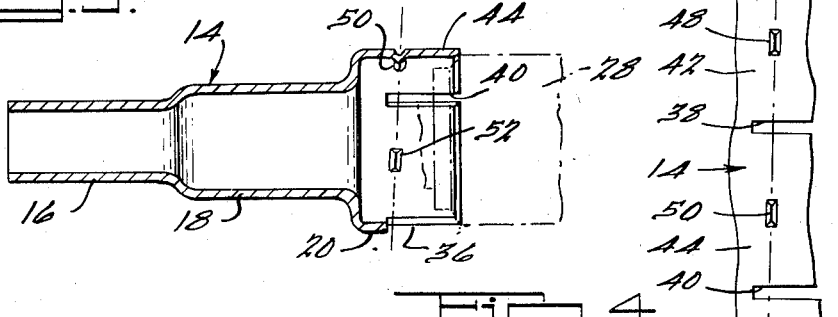
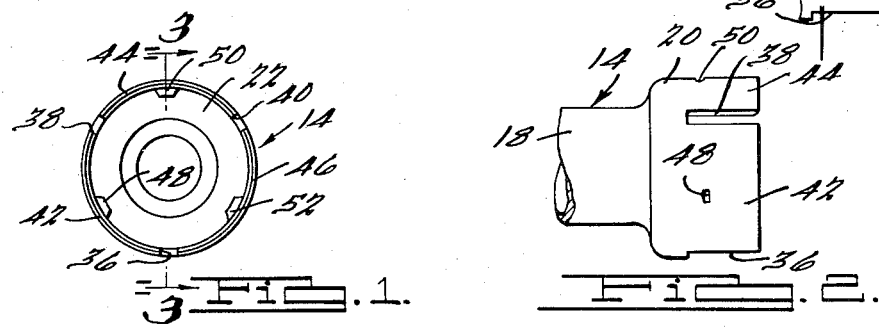
INVENTOR.
Alfred Botti.
BY
Harness, Dickey & Pierce
ATTORNEYS.

United States Patent Office 2,872,793
Patented Feb. 10, 1959

2,872,793

SPEEDOMETER CABLE FITTING

Alfred Botti, Detroit, Mich., assignor to C. M. Hall Lamp Co., Detroit, Mich., a corporation of Michigan Application March 21, 1957, Serial No. 647,703

12 Claims. (Cl. 64—4)

This invention relates to fittings for flexible cables.

In the customary practice, flexible cables, such as speedometer cables, are associated with the mechanism to be driven, such as a speedometer, by means of an assembly including a ferrule secured to the cable casing. The ferrule has a forward face abutting the end of or a shoulder on a threaded stud integral with the speedometer housing, and also has a forward annular flange to retain an internally threaded nut thereupon, the nut threadedly engaging the stud.

The objects of this invention are to simplify and reduce the cost of manufacture and installation of flexible cable assemblies of that nature, and to facilitate the attachment of such a flexible cable to the speedometer or other driven device.

The manner of accomplishing the foregoing objects and other objects and features of the invention will become apparent from the following detailed description of an embodiment of the invention when read with reference to the accompanying drawings in which:

Fig. 1 is an end elevational view of the ferrule of an assembly embodying the principles of the present invention;

Fig. 2 is a fragmentary side elevational view of the ferrule of Fig. 1;

Fig. 3 is a sectional view taken substantially along the line 3—3 of Fig. 1 with a threaded stud with which the ferrule can be associated represented in phantom and in a partially assembled relationship with the ferrule;

Fig. 4 is a development of a portion of the inner surface of the ferrule of Fig. 3; and Fig. 5 is a sectional view similar to that of Fig. 3 but illustrating the complete cable fitting assembly in its assembled relationship with a threaded stud.

Referring first to Fig. 5 of the drawings, the disclosed cable assembly comprises a central, wound-wire, flexible core 10 supported within a wound-wire flexible casing 12 of any appropriate configuration. The disclosed end of the core 10 is coaxially disposed within a ferrule 14.

Ferrule 14 is tubular and has a first portion 16 having an internal diameter approximately equal to the external diameter of the flexible casing 12. Casing 12 is secured within portion 16 of ferrule 14 in any suitable fashion, such as by crimping that portion of the ferrule. Ferrule 14 further includes an intermediate portion 18 representatively of slightly larger diameter than portion 16, and an end portion 20 of greater internal diameter than intermediate portion 18, the flange interconnecting portions 18 and 20 constituting an annular shoulder 22.

At its point of entry into the portion 18 of ferrule 14, the flexible core 10 passes through a nonmetallic disc 24 nonrotatably secured within portion 18 and against one face of which a collar 26 secured to the core 10 abuts.

The end of core 10 is provided with suitable flats or a suitable fitting and enters a central, longitudinal aperture in a stud 28 which is integral with the housing of the driven element, such as a speedometer. A rotatable element, not shown, disposed within the stud 28 is engaged and rotatively driven by the flexible core 10.

The representatively illustrated stud 28 comprises a generally right circular cylindrical body portion terminating in an end face 30 which is adapted to abut the annular shoulder 22 of the ferrule 14. The body portion is provided with an external thread 32 which extends into proximity to end face 30 and which may be of any suitable pitch. The threaded studs employed on speedometers are customarily of a five-eighths inch major diameter, with the lead angle being selected to provide eighteen threads per inch, that lead angle being about 1 degree and 43 minutes.

One function of the ferrule 14 is to secure the flexible casing 12 in fixed relationship to the stud 32 and to thereby support the flexible core 10 in its engaged position within the longitudinal aperture in the stud 32. To this end, the portion 20 of the ferrule 14 is preferably formed with an internal diameter which is slightly less than the major diameter of the thread 32. For example, with a nominal major thread diameter of 0.625 inch, the free-position internal diameter of the end portion 20 may be in the order of 0.615 to 0.620 inch. To permit the ferrule to be slid over the threads 32, the tip end of the inner surface is or may be chamfered as at 34 and is longitudinally or axially slotted at a plurality of points, three such slots 36, 38 and 40 equally spaced about the periphery of the end portion 20 being representatively illustrated in the drawings. Since the function of these slots is to permit effective expansion of the internal diameter of the end portion 20 and to divide that end portion into a plurality of axially extending flexible finger portions 42, 44 and 46, their width is not critical.

Projections or thread elements 48, 50 and 52 are formed upon each of the spring fingers 42, 44 and 46, respectively. As may best be seen in the development of Fig. 4, each of the projections 48, 50 and 52 is disposed at an angle 54, upon the surface of the ferrule 14, which is the same or substantially the same as the lead angle of the thread 32 on the stud 28. Additionally, the several projections or thread elements 48, 50 and 52 are aligned with one another at that lead angle, that is, those elements are disposed upon a helix of the same or substantially the same pitch as the thread 32. Each of those projections is also formed, in cross section, as a thread of the same type as thread 32.

When the ferrule 14 is brought into position to be assembled upon the stud 28, with the core 10 aligned with the longitudinal aperture in that stud, the several flexible fingers 42, 44 and 46 are cammed outwardly by the leading side 56 (Fig. 5) of the first effective turn of the thread 32 so that the effective internal diameter of the end portion 20 is increased. As the ferrule is moved in translation relative to the stud 28, the forward or leading sides of the projections 48, 50 and 52 engage and are cammed outwardly by the leading side 56 of the first turn of the thread 32, pass over the thread and come into engagement with the following side 58 of the thread 32. It will be appreciated that for this to occur the end portion 20 adjacent the projections 48, 50 and 52 must be capable of expanding its internal diameter. Consequently, the length of slots 36, 38 and 40 should be such that they extend beyond (to the left in the views of Figs. 2, 3, 4 and 5) of the projections 48, 50 and 52. While the projections are shown to be in engagement with the first turn of the thread 32, those projections may engage a succeeding turn if desired.

The length of each of the projections or thread elements 48, 50 and 52 is subject to variation. Their length is a contributing factor to the amount of force required to assemble the ferrule 14 to the stud 28 and to the amount of force required to disassemble those two elements. In practice it has been found to be preferable to form the projections 48, 50 and 52 of relatively short length, as illustrated.

It is preferred, but not imperative, that the ferrule 14 be placed upon the stud 28 in a position such that the end 30 of the stud 28 abuts the annular shoulder 22 on the ferrule 14. Consequently, it is contemplated that the ferrule may be moved in translation relative to the stud 32 to slide the ferrule over the stud, and, after the projections 48, 50 and 52 are in engagement with the thread 32, that the ferrule be rotated through a small angle to establish that engagement between the surfaces 30 and 32.

It has been found that the engagement between the thread elements and the thread 32, coupled with the force exerted by the spring fingers 42, 44 and 46 upon the thread 32, effectively locks the ferrule 14 to the stud 32 so that there is little or no danger of accidental or unintentional disassembly of those parts. However, due to the described nature of the interlocking means, the assembly of those elements may be accomplished very rapidly.

While it will be apparent that the embodiment of the invention herein disclosed is well calculated to fulfill the objects of the invention, it will be appreciated that the invention is susceptible to modification, variation and change without departing from the proper scope or fair meaning of the subjoined claims.

What is claimed is:

1. In a control cable assembly for repeated assembly to and disassembly from a longitudinally apertured stud having an external thread extending into proximity with one end thereof, a flexible casing, a flexible core supported within said casing and having an end portion insertable in the longitudinal aperture of the stud, a tubular ferrule secured to said casing and coaxial with said core and having an end portion slidable over the thread on the stud, and a plurality of discrete, circumferentially spaced thread elements on the inner surface of said end portion of said ferrule, said thread elements being disposed helically at the lead angle of the thread on the stud, said thread elements being engageable with the thread on the stud.

2. In a control cable assembly for repeated assembly to and disassembly from a longitudinally apertured stud having an external thread extending into proximity with one end thereof, a flexible casing, a flexible core supported within said casing and having an end portion insertable in the longitudinal aperture of the stud, a tubular ferrule secured to said casing and coaxial with said core and having an end portion slidable over the thread on the stud, and a plurality of discrete, circumferentially spaced thread elements on the inner surface of said end portion of said ferrule, said thread elements being disposed helically at the lead angle of the thread on the stud, said thread elements being cammable by the leading side of the thread during the sliding of said ferrule end portion over the thread and engageable with the following side of the thread.

3. In a control cable assembly for repeated assembly to and disassembly from a longitudinally apertured stud having an external thread extending into proximity with one end thereof, a flexible casing, a flexible core supported within said casing and having an end portion insertable in the longitudinal aperture of the stud, a tubular ferrule secured to said casing and coaxial with said core and having an end portion slidable over the thread on the stud, and a projection in the inner surface of said end portion of said ferrule cammable by the leading side of the thread during the sliding of said ferrule end portion over the thread and engageable with the following side of the thread, a portion of said ferrule end portion having an inner diameter less than the major diameter of the thread and having a longitudinal slot therein.

4. In a control cable assembly for repeated assembly to and disassembly from a longitudinally apertured stud having an external thread extending into proximity with one end thereof, a flexible casing, a flexible core supported within said casing and having an end portion insertable in the longitudinal aperture of the stud, a tubular ferrule secured to said casing and coaxial with said core and having an end portion slidable over the thread on the stud, and a projection in the inner surface of said end portion of said ferrule cammable by the leading side of the thread during the sliding of said end portion over the thread and engageable with the following side of the thread, a portion of said ferrule end portion having an inner diameter less than the major diameter of the thread and having a longitudinal slot therein extending from the edge thereof which is first to engage the stud to a point proximate said projection.

5. In a control assembly for repeated assembly to and disassembly from a longitudinally apertured stud having an external thread extending into proximity with one end thereof, a flexible casing, a flexible core supported within said casing and having an end portion insertable in the longitudinal aperture of the stud, a tubular ferrule secured to said casing and coaxial with said core and having an end portion slidable over the thread on the stud, and a plurality of discrete, circumferentially spaced thread elements on the inner surface of said end portion of said ferrule, each of said thread elements being elongated in the direction of the lead angle of the thread and said plural thread elements being disposed helically at the lead angle of the thread on the stud, said thread elements being engageable with the thread on the stud.

6. In a control cable assembly for repeated assembly to and disassembly from a longitudinally apertured stud having an external thread extending into proximity with one end thereof, a flexible casing, a flexible core supported within said casing and having an end portion insertable in the longitudinal aperture of the stud, a tubular ferrule secured to said casing and coaxial with said core and having an end portion slidable over the thread on the stud, and a plurality of discrete, circumferentially spaced thread elements on the inner surface of said end portion of said ferrule, said thread elements being disposed helically at the lead angle of the thread on the stud, said thread elements being engageable with the thread on the stud, a portion of said ferrule end portion having an inner diameter less than the major diameter of the thread and having a longitudinal slot therein extending from the edge thereof which is first to engage the stud to a point proximate said thread elements.

7. In a control cable assembly for repeated assembly to and disassembly from a longitudinally apertured stud having an external thread extending into proximity with one end thereof, a flexible casing, a flexible core supported within said casing and having an end portion insertable in the longitudinal aperture of the stud, a tubular ferrule secured to said casing and coaxial with said core and having a plurality of extending flexible finger portions the inner surfaces of which define a cylinder having a diameter slightly smaller than the major diameter of the thread, said ferrule finger portions being slidable over the thread, and a projection on the inner surface of each of said finger portions, all of said projections being engageable with the thread.

8. In a control cable assembly for repeated assembly to and disassembly from a longitudinally apertured stud having an external thread extending into proximity with one end thereof, a flexible casing, a flexible core supported within said casing and having an end portion insertable in the longitudinal aperture of the stud, a tubular ferrule secured to said casing and coaxial with said core and having a plurality of extending flexible finger portions the inner surfaces of which define a cylinder having a diameter slightly smaller than the major diameter of the thread, said ferrule finger portions being slidable over the thread, and a projection on the inner surface of each of said finger portions, all of said projections being engageable with the thread, said projections being disposed helically at the lead angle of the thread.

9. In a control cable assembly for repeated assembly to and disassembly from a longitudinally apertured stud having an external thread extending into proximity with one end thereof, a flexible casing, a flexible core supported within said casing and having an end portion insertable in the longitudinal aperture of the stud, a tubular ferrule secured to said casing and coaxial with said core and having a plurality of extending flexible finger portions the inner surfaces of which define a cylinder having a diameter slightly smaller than the major diameter of the thread, said ferrule finger portions being slidable over the thread, and a projection on the inner surface of each of said finger portions, all of said projections being engageable with the thread, said projections being cammable by the leading side of the thread during the sliding of said end portion over the thread and engageable with the following side of the thread.

10. In a control cable assembly for repeated assembly to and disassembly from a longitudinally apertured stud having an external thread extending into proximity to one end thereof, a flexible casing, a flexible core supported within said casing and having an end portion insertable in the longitudinal aperture of the stud, a tubular ferrule coaxial with said core and having a portion secured to said casing, an end portion on said ferrule having an inner diameter smaller than the major diameter of the thread on the stud, an internal annular shoulder on said ferrule adjacent said end portion, said end portion being longitudinally slotted to define a plurality of flexible finger portions which are slidable over the thread on the stud to a point where the end of the stud abuts said shoulder, and a projection on the inner surface of each of said finger portions engageable with the thread when the end of the stud is in abutment with said shoulder.

11. In a control cable assembly for repeated assembly to and disassembly from a longitudinally apertured stud having an external thread extending into proximity to one end thereof, a flexible casing, a flexible core supported within said casing and having an end portion insertable in the longitudinal aperture of the stud, a tubular ferrule coaxial with said core and having a portion secured to said casing, an end portion on said ferrule having an inner diameter smaller than the major diameter of the thread on the stud, an internal annular shoulder on said ferrule adjacent said end portion, said end portion being longitudinally slotted to define a plurality of flexible finger portions which are slidable over the thread on the stud, and a projection on the inner surface of each of said finger portions, each said projection being disposed helically at the lead angle of the thread and being cammable by the leading side of the thread during the sliding of said flexible finger portions over the thread and engageable with the following side of the thread.

12. In a control cable assembly for repeated assembly to and disassembly from a longitudinally apertured stud having an external thread extending into proximity to one end thereof, a flexible casing, a flexible core supported within said casing and having an end portion insertable in the longitudinal aperture of the stud, a tubular ferrule coaxial with said core and having a portion secured to said casing, an end portion on said ferrule having an inner diameter smaller than the major diameter of the thread on the stud, an internal annular shoulder on said ferrule adjacent said end portion, said end portion being longitudinally slotted to define a plurality of flexible finger portions which are slidable over the thread on the stud, and a projection on the inner surface of each of said finger portions, each said projection being disposed helically at the lead angle of the thread and being cammable by the leading side of the thread during the sliding of said flexible finger portions over the thread and engageable with the following side of the thread, said ferrule being rotatable after said projections have engaged the thread to advance said projections along the thread to a point where the end of the stud abuts said shoulder.

References Cited in the file of this patent

UNITED STATES PATENTS

| | | |
|---|---|---|
| 1,250,364 | Selden | Dec. 18, 1917 |
| 1,324,787 | Berge | Dec. 16, 1919 |
| 1,872,288 | Helgeby | Aug. 16, 1932 |
| 2,092,535 | Schnorr | Sept. 7, 1937 |
| 2,643,146 | Morse | June 23, 1953 |